(12) United States Patent
Baek et al.

(10) Patent No.: US 9,362,841 B2
(45) Date of Patent: Jun. 7, 2016

(54) POWER CONVERSION APPARATUS AND METHOD OF CONTROLLING THE SAME

(71) Applicant: Samsung Electronics Co., Ltd., Suwon-Si, Gyeonggi-Do (KR)

(72) Inventors: Jei-hoon Baek, Seoul (KR); Jong-soo Kim, Suwon-si (KR); Hyun-bae Kim, Yongin-si (KR); Kyu-bum Han, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 387 days.

(21) Appl. No.: 13/733,433

(22) Filed: Jan. 3, 2013

(65) Prior Publication Data

US 2013/0335041 A1    Dec. 19, 2013

(30) Foreign Application Priority Data

Jun. 19, 2012 (KR) .......................... 10-2012-0065619

(51) Int. Cl.
*H02M 7/12* (2006.01)
*H02P 9/00* (2006.01)
*H02M 7/155* (2006.01)
*H02M 1/00* (2006.01)

(52) U.S. Cl.
CPC ............... *H02M 7/12* (2013.01); *H02M 7/155* (2013.01); *H02P 9/00* (2013.01); *H02M 2001/0087* (2013.01)

(58) Field of Classification Search
None
See application file for complete search history.

(56) References Cited

U.S. PATENT DOCUMENTS

| 5,959,430 A | * | 9/1999 | Yuki et al. | 318/805 |
|---|---|---|---|---|
| 2005/0156549 A1 | * | 7/2005 | Suzuki et al. | 318/437 |
| 2009/0244945 A1 | * | 10/2009 | Hatanaka | 363/127 |
| 2011/0310642 A1 | * | 12/2011 | Dai et al. | 363/37 |
| 2012/0087160 A1 | | 4/2012 | Yang et al. | |

FOREIGN PATENT DOCUMENTS

| JP | 2009-261169 A | 11/2009 |
|---|---|---|
| KR | 10-0560259 B1 | 3/2006 |
| KR | 10-1025089 B1 | 3/2011 |
| KR | 2011-0042370 A | 4/2011 |

OTHER PUBLICATIONS

Malinowski, M. et al. "Virtual-Flux-Based Direct Power Control of Three-Phase PWM Rectifiers"; IEEE Transactions on Industry Applications, vol. 37, No. 4, p. 1019-1027; Jul./Aug. 2001.
J. Baek, et al., "Thyristor-Based Current-Fed Drive with Direct Power Control for Permanent Magnet-Assisted Synchronous Reluctance Generator," Int'l Journal of Electronics, vol. 102, Issue 3, 2015; published online on Feb. 20, 2014.

* cited by examiner

*Primary Examiner* — Timothy J Dole
*Assistant Examiner* — Monica Mata
(74) *Attorney, Agent, or Firm* — Harness, Dickey & Pierce, P.L.C.

(57) ABSTRACT

A power conversion apparatus including a current source converter configured to convert Alternate Current (AC) power to Direct Current (DC) power; a power controller configured to set a d-axis current command and a q-axis current command, which correspond to the AC power to the current source converter, by reflecting a difference between a measurement DC link voltage measured at an output terminal of the current source converter and a DC link voltage set by a DC link voltage command; and a phase angle controller configured to adjust a phase angle of the current source converter and transmit the adjusted phase angle to the current source converter, in response to the d-axis current command and the q-axis current command.

17 Claims, 10 Drawing Sheets

POWER CONVERSION APPARATUS AND METHOD OF CONTROLLING THE SAME

CROSS-REFERENCE TO RELATED APPLICATIONS

This application claims the benefit of Korean Patent Application No. 10-2012-065619, filed on Jun. 19, 2012 in the Korean Intellectual Property Office, the disclosure of which is incorporated herein in its entirety by reference.

BACKGROUND

1. Field

The present disclosure relates to a power conversion apparatus and/or a method of controlling the same, and more particularly, to a power conversion apparatus capable of realizing high efficiency even while operating under simple structure and control, and/or a method of controlling the same.

2. Description of the Related Art

Along with the growth of embedded systems and portable power generation devices, a power conversion apparatus, which may be implemented and operated at a low cost while guaranteeing reliability, and a method of controlling the same are in demand.

SUMMARY

Provided are a power conversion apparatus capable of realizing high efficiency even while operating by simple implementation and control, and/or a method of controlling the same.

Additional aspects will be set forth in part in the description which follows and, in part, will be apparent from the description, or may be learned by practice of the presented example embodiments.

According to some example embodiments, a power conversion apparatus includes a current source converter configured to convert Alternate Current (AC) power to Direct Current (DC) power; a power controller configured to set a d-axis current command and a q-axis current command, which correspond to the AC power to the current source converter, by reflecting a difference between a measurement DC link voltage measured at an output terminal of the current source converter and a DC link voltage set by a DC link voltage command; and a phase angle controller configured to adjust a phase angle of the current source converter and transmit the adjusted phase angle to the current source converter, in response to the d-axis current command and the q-axis current command.

The current source converter may be a thyristor converter.

The power controller may include a vector rotator configured to convert a phase voltage of the AC power to a DC d-axis voltage vector and a DC q-axis voltage vector; a proportional-integral controller configured to generate a power command by integrating the difference between the measurement DC link voltage and the DC link voltage set by the DC link voltage command; a differentiator configured to output a rotor angular frequency of a motor, which delivers dynamic energy to a generator configured to generate the AC power, by differentiating a power factor angle of the generator; and a d-q axis current command setting unit configured to set the d-axis current command and the q-axis current command in response to the DC d-axis voltage vector, the DC q-axis voltage vector, the power command, and the rotor angular frequency.

The d-q axis current command setting unit may include a first calculating unit configured to receive the power command and configured to set a phase voltage command and a torque angle command; a second calculating unit configured to set a d-axis voltage vector command and a q-axis voltage vector command in response to the phase voltage command and the torque angle command; a current compensator configured to set a first d-axis compensation current value and a first q-axis compensation current value in response to the DC d-axis voltage vector, the DC q-axis voltage vector, and the rotor angular frequency; and an adder configured to output the d-axis current command and the q-axis current command, the d-axis current command being a sum of the first d-axis compensation current value and a second d-axis compensation current value, the q-axis current command being a sum of the first q-axis compensation current value and a second q-axis compensation current value, the second d-axis compensation current value and the second q-axis compensation current value being obtained by applying a gain to the d-axis voltage vector command and the q-axis voltage vector command, respectively.

The first calculating unit may be configured to set the torque angle command by differentiating, by a torque angle, output effective power of the generator for generating the AC power.

The torque angle command may indicate a value of a torque angle for generating maximum output effective power from the AC power.

The phase angle controller may be configured to set a DC link current command indicating a value of a DC link current of the current source converter demanded by the d-axis current command and the q-axis current command and may adjust the phase angle for controlling a rectifying device of the current source converter by applying a gain to the DC link current command.

A power conversion system may include the power conversion apparatus and a generator configured to generate the AC power.

The generator may include at least one selected from the group consisting of a Permanent Magnet-assisted Synchronous Reluctance Generator (PMa-SynRG), an interior permanent magnet generator, and an induction machine.

A power conversion system may include the power conversion apparatus and a thyristor inverter connected to the output terminal of the current source converter to inverse convert an output of the current source converter to AC power and apply the inverse-converted AC power to a load.

The power conversion apparatus may further include a beta controller configured to control turning-on of a thyristor of the thyristor inverter by adjusting a rectifying angle that is calculated from an effective current and an invalid current of the load.

According to some example embodiments, a method of controlling a power conversion apparatus includes measuring a Direct Current (DC) link voltage at an output terminal of a current source converter configured to convert Alternate Current (AC) power to DC power; setting a d-axis current command and a q-axis current command, which correspond to the AC power applied to the current source converter, by reflecting a difference between the measured DC link voltage and a DC link voltage demanded by the current source converter; and controlling a DC link voltage of the current source converter by adjusting a phase angle of the current source converter in response to the d-axis current command and the q-axis current command.

BRIEF DESCRIPTION OF THE DRAWINGS

These and/or other aspects will become apparent and more readily appreciated from the following description of example embodiments, taken in conjunction with the accompanying drawings in which.

DETAILED DESCRIPTION

Figure 1:
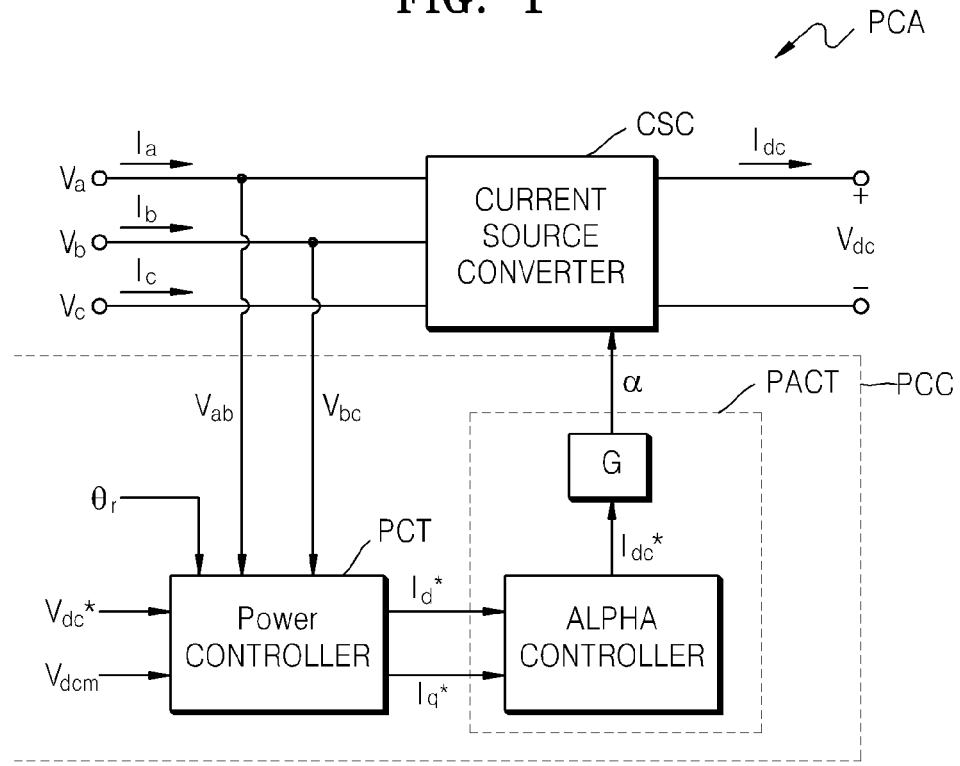
FIG. 1 is a block diagram of a power conversion apparatus according to an example embodiment.

Reference will now be made in detail to some example embodiments, examples of which are illustrated in the accompanying drawings, wherein like reference numerals refer to like elements throughout. In this regard, the present example embodiments may have different forms and should not be construed as being limited to the descriptions set forth herein. Accordingly, some example embodiments are described below, by referring to the figures, to explain aspects of the present description.

FIG. 1 is a block diagram of a power conversion apparatus PCA according to an example embodiment.

Referring to FIG. 1, the power conversion apparatus PCA according to an example embodiment includes a current source converter CSC, a power controller PCT, and a phase angle controller PACT. The current source converter CSC converts a received 3-phase power from Alternate Current (AC) power to Direct Current (DC) link power. For example, the current source converter CSC converts received phase currents Ia, Ib, and Ic to a DC link current Idc. The current source converter CSC may perform a rectifying operation with a rectifying device for passing a current in only one direction since the rectifying device has a small forward resistance and a sufficiently large backward resistance. A detailed example embodiment of the current source converter CSC will be described below.

A power converter controller PCC includes the power controller PCT and the phase angle controller PACT. The power controller PCT and the phase angle controller PACT adjust a phase angle $\alpha$ of the current source converter CSC so that an output (a DC link voltage $V_{dc}$ and the DC link current $I_{dc}$) of the current source converter CSC corresponds to a set DC link voltage command $V_{dc}*$. The DC link voltage command $V_{dc}*$ may be set to a value of the DC link voltage $V_{dc}$ for generating maximum effective power in the power conversion apparatus PCA at a minimum phase voltage. The power controller PCT and the phase angle controller PACT will now be described in detail.

Figure 2:
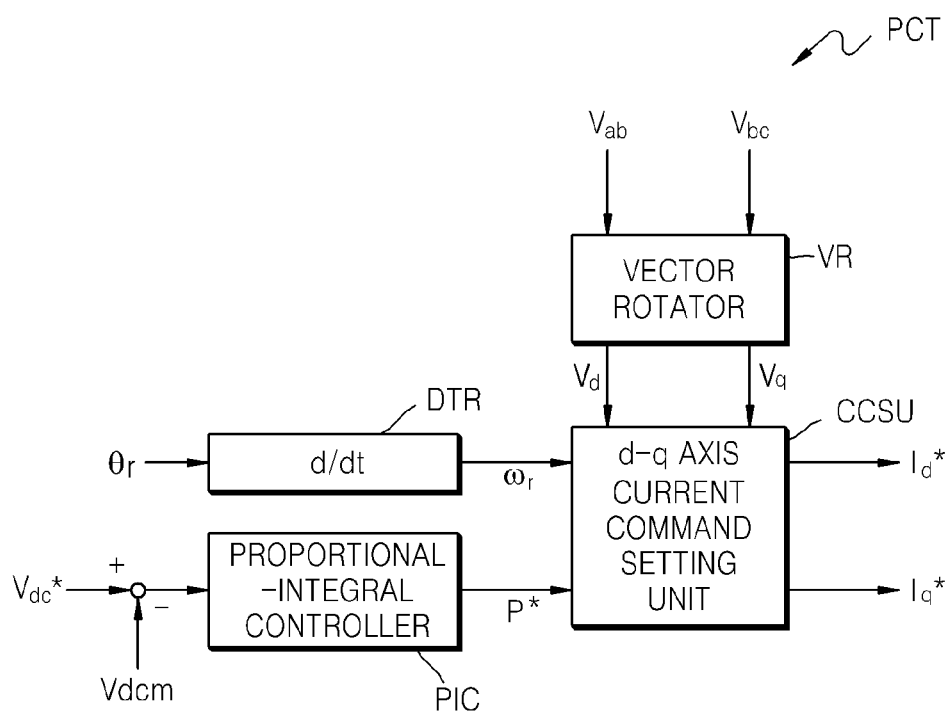
FIG. 2 is a block diagram of a power controller in the power conversion apparatus of FIG. 1, according to an example embodiment.

FIG. 2 is a block diagram of the power controller PCT in the power conversion apparatus PCA of FIG. 1, according to an example embodiment.

Referring to FIGS. 1 and 2, the power controller PCT may include a vector rotator VR, a d-q axis current command setting unit CCSU, a differentiator DTR, and a proportional-integral controller PIC. Hereinafter, a power conversion operation related only to a phase voltage Va and the phase current Ia from among phase voltages Va, Vb, and Vc and the phase currents Ia, Ib, and Ic is described. The other phase voltages Vb and Vc and the other phase currents Ib and Ic may be converted in the same way as the phase voltage Va and the phase current Ia described below.

The vector rotator VR converts line voltages Vab and Vbc to a DC d-axis voltage vector Vd and a DC q-axis voltage vector Vq, respectively.

Figure 3:
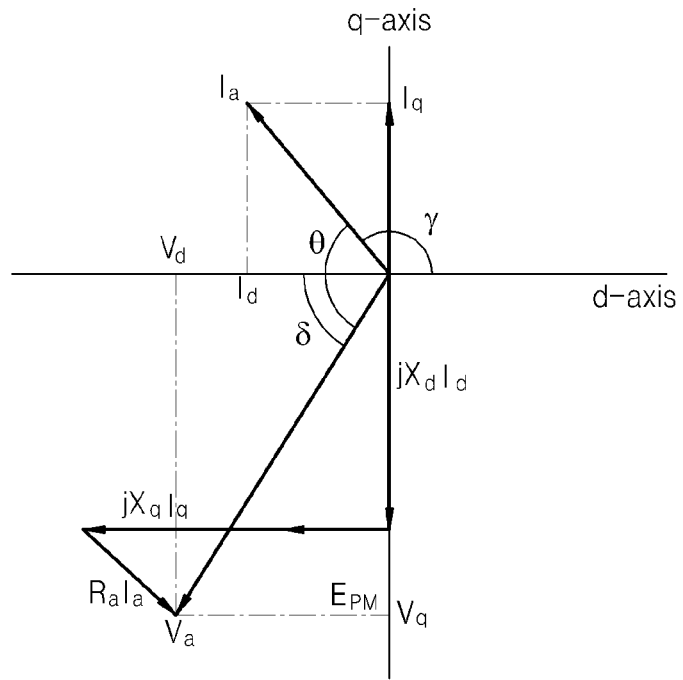
FIG. 3 is a phasor diagram showing an AC power with d- and q-axes components.

FIG. 3 is a phasor diagram showing AC power with d- and q-axes components.

Referring to FIGS. 2 and 3, the vector rotator VR may convert the line voltages $V_{ab}$ and $V_{bc}$ to the DC d-axis voltage vector $V_d$ and the DC q-axis voltage vector $V_q$, respectively, based on Equation 1 shown below. In a case of a Permanent Magnet-assisted Synchronous Reluctance Generator (PMa-SynRG), the d-axis may denote a torque axis, and the q-axis may denote a magnetic flux axis.

$$V_d = V_s \cdot \cos \delta = -X_q \cdot I_q + E_{PM}$$

$$V_q = V_s \cdot \sin \delta = X_d \cdot I_d \qquad (1)$$

In Equation 1, $V_s$ denotes an amplitude of $V_a$, $\delta$ denotes a torque angle of a generator, which may be included in the power conversion apparatus PCA according to an example embodiment, and $E_{PM}$ denotes back-RMF, i.e., a motor (or engine) counter electromotive force for delivering dynamic energy to the generator generating an AC power source. A detailed example embodiment of the generator and motor, which may be included in the power conversion apparatus PCA according to an example embodiment, will be described below. In addition, in Equation 1, $X_q$ and $X_d$ denote a q-axis reactance and a d-axis reactance, respectively.

The d-q axis current command setting unit CCSU receives the DC d-axis voltage vector $V_d$, the DC q-axis voltage vector $V_q$, a rotor angular frequency $\omega_r$, and a power command P* and sets a d-axis current command $I_d*$ and a q-axis current command $I_q*$. The rotor angular frequency $\omega_r$ is an angular frequency of a rotor of the motor, which may be included in the power conversion apparatus PCA according to an example embodiment. The rotor angular frequency $\omega_r$ may be a result of differentiating a position angle ($\theta_r$) of the generator, which may be included in the power conversion apparatus PCA according to an example embodiment, in the differentiator DTR. The power command P* may be generated as a result of integrating a difference between the DC link voltage command $V_{dc}*$ and a measurement DC link voltage $V_{dcm}$, which is measured at an output terminal of the current source converter CSC, in the proportional-integral controller PIC.

Figure 4:
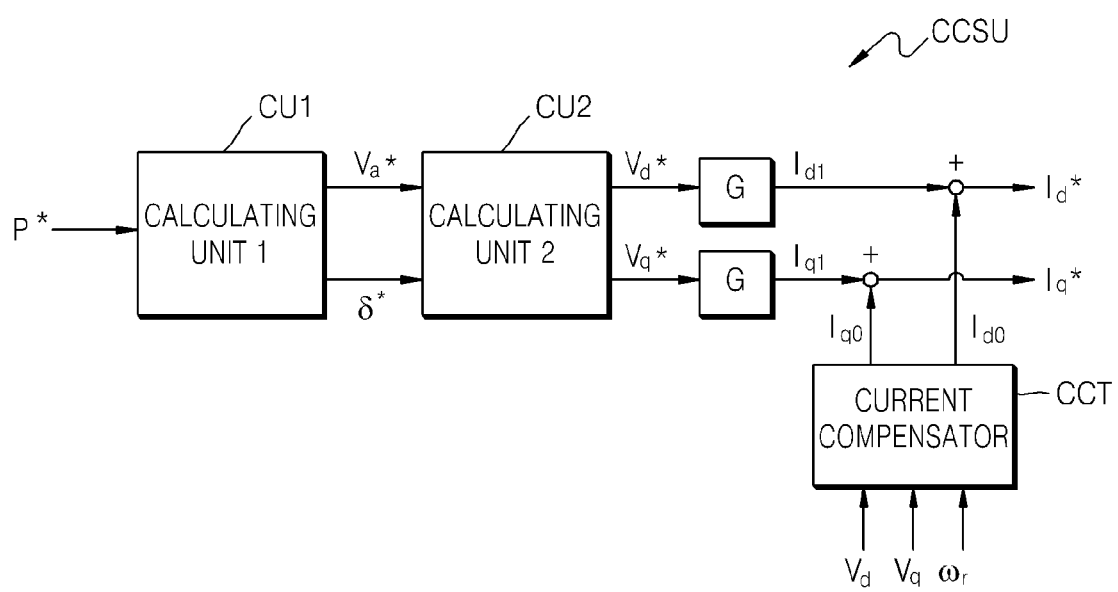
FIG. 4 is a block diagram of a d-q axis current command setting unit in the power controller of FIG. 2, according to an example embodiment.

FIG. 4 is a block diagram of the d-q axis current command setting unit CCSU in the power controller PCT of FIG. 2, according to an example embodiment.

Referring to FIGS. 2 and 4, the d-q axis current command setting unit CCSU may include a first calculating unit CU1, a second calculating unit CU2, a current compensator CCT, and adders+. The first calculating unit CU1 sets a phase voltage command $V_a^*$ and a torque angle command $\delta^*$ corresponding to the power command P* that is an output of the proportional-integral controller PIC. For example, the first calculating unit CU1 sets the torque angle command $\delta^*$, including information about the torque angle $\delta$ corresponding to the power command P* based on Equation 2.

$$\delta = \cos^{-1}\left(\frac{-E_{PM}X_d \pm \sqrt{E_{PM}^2 X_d^2 + 8 \cdot V_a^2(X_q - X_d)^2}}{8 \cdot V_a(X_q - X_d)}\right) \quad (2)$$

Equation 2 may be derived from Equations 3 to 5.

$$I_a \cdot \cos\theta = I_d \cdot \cos\delta I_q \cdot \sin\delta \quad (3)$$

Equation 3 shows a relationship among the phase current $I_a$, the d-axis current $I_d$, and the q-axis current $I_q$ through the phasor diagram of FIG. 3. Using Equations 1 and 3, output effective power $P_e$ of the generator, which may be included in the power conversion apparatus PCA according to an example embodiment, may be expressed by Equation 4.

$$P_e = V_a I_a \cdot \cos\theta = \frac{E_{PM}V_S \cdot \sin\delta}{X_q} + \frac{V_a^2}{2} \cdot \sin 2\delta \left(\frac{X_q - X_d}{X_d \cdot X_q}\right) \quad (4)$$

In Equation 4, to set the torque angle $\delta$ for outputting maximum output effective power $P_e$ at a minimum voltage, Equation 5 may be obtained by differentiating Equation 4 by the torque angle $\delta$.

$$\frac{E_{PM}V_a}{X_q} \cdot \frac{d}{dt}\sin\delta + \frac{V_a^2}{2}\left(\frac{X_q - X_d}{X_d X_q}\right) \cdot \frac{d}{dt}\sin 2\delta = 0 \quad (5)$$

Equation 2 is a result of arranging Equation 5 by torque angle $\delta$. Accordingly, the torque angle $\delta$ for generating the maximum effective power $P_e$ may be calculated from Equation 2.

The second calculating unit CU2 sets a d-axis voltage vector command $V_d^*$ and a q-axis voltage vector command $V_q^*$ corresponding to the phase voltage command $V_a^*$ and the torque angle command $\delta^*$, respectively. The current compensator CCT sets a first d-axis compensation current value $I_d 1$ and a first q-axis compensation current value $I_q 1$ corresponding to the DC d-axis voltage vector $V_d$ and the DC q-axis voltage vector $V_q$, which are output from the vector rotator VR, and the rotor angular frequency $\omega_r$, which is output from the differentiator DTR.

The adder+sets the d-axis current command $I_d^*$ and the q-axis current command $I_q^*$ by adding the first d-axis compensation current value $I_d 0$ and the first q-axis compensation current value $I_q 0$ to a second d-axis compensation current value $I_d 1$ and a second q-axis compensation current value $I_q 1$ obtained by applying a gain G to the d-axis voltage vector command $V_d^*$ and the q-axis voltage vector command $V_q^*$, respectively.

Referring back to FIG. 1, the phase angle controller PACT sets a DC link current command $I_{dc}^*$ based on the d-axis current command $I_d^*$ and the q-axis current command $I_q^*$, as in Equation 6.

$$I_{dc}^* = \sqrt{I_d^{*2} + I_q^{*2}} \quad (6)$$

The DC link current command $I_{dc}^*$ indicates information about an output current (the DC link current $I_{dc}$) demanded by the current source converter CSC, to which a difference between the DC link voltage command $V_{dc}^*$ including information about an output voltage (the DC link voltage $V_{dc}$) demanded by the current source converter CSC and a measurement DC link voltage command $V_{dcm}$ actually measured at the output terminal of the current source converter CSC is reflected.

The phase angle controller PACT applies the phase angle $\alpha$, which is set by applying the gain G to the DC link current command $I_{dc}^*$ set by an alpha controller ACT, to the current source converter CSC.

Figure 5:
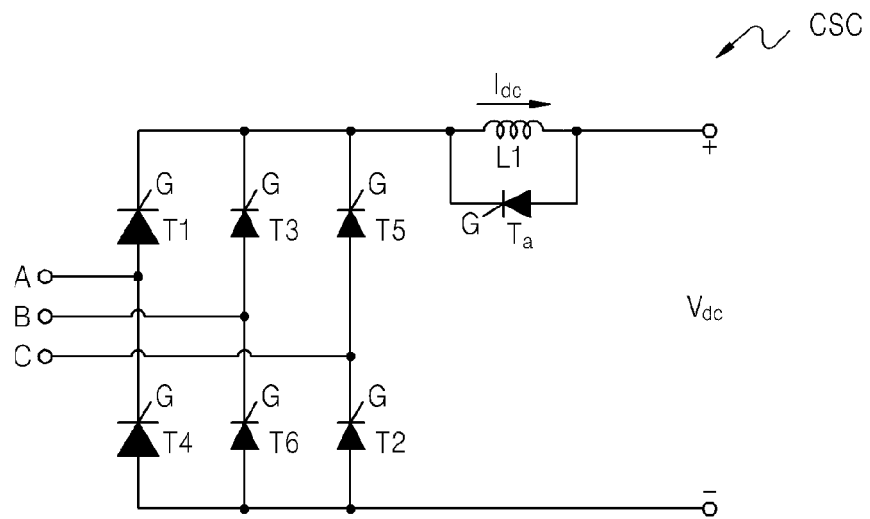
FIG. 5 is a circuit diagram of a current source converter in the power conversion apparatus of FIG. 1, according to an example embodiment.

FIG. 5 is a circuit diagram of the current source converter CSC in the power conversion apparatus PCA of FIG. 1, according to an example embodiment.

Referring to FIGS. 1 and 5, the current source converter CSC may be a thyristor converter. The thyristor converter CSC is a converter using thyristors T1 to T6 as a rectifying device. Each of the thyristors T1 to T6 is a silicon rectifier having an anode, a cathode, and a third electrode (a gate G). The DC link voltage $V_{dc}$ and the DC link current $I_{dc}$ may be controlled by adjusting a phase (the phase angle $\alpha$) of a control current (switching signal) supplied to the gate G of each of the thyristors T1 to T6.

Figure 6:
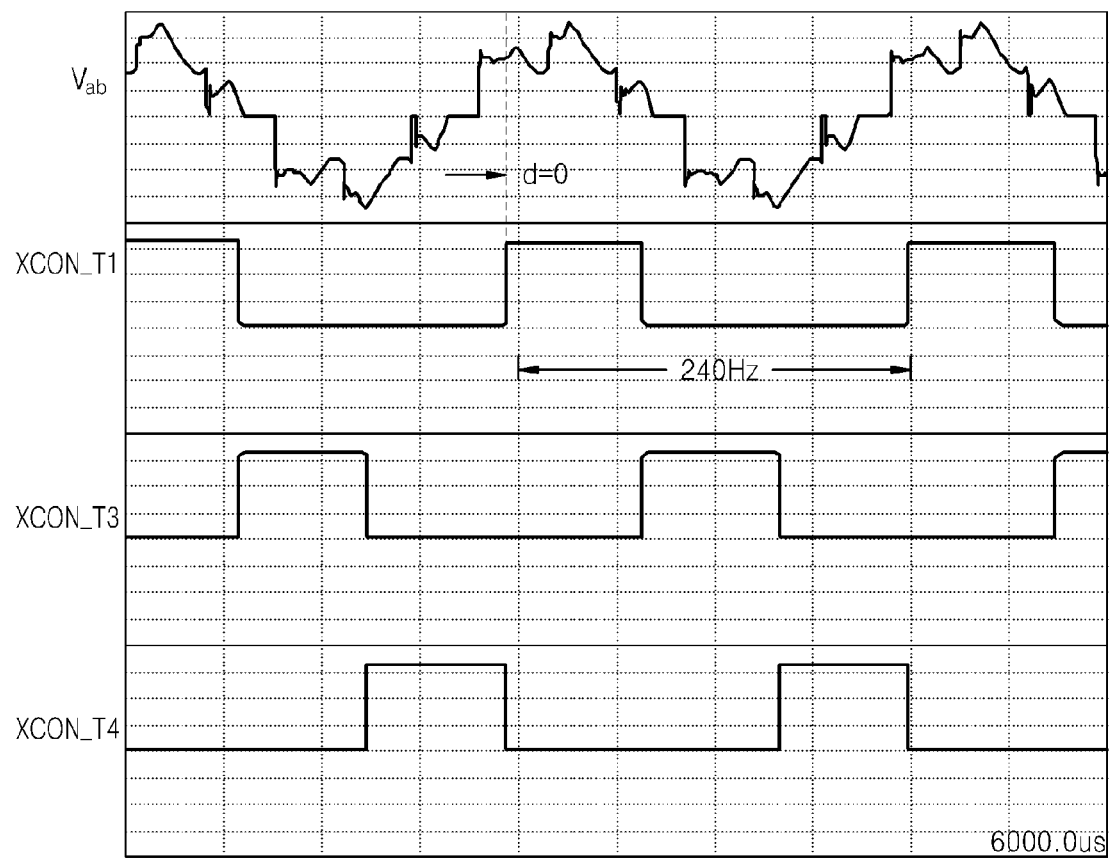
FIGS. 6 to 8 are graphs showing an operation of controlling a demanded DC link voltage and DC link current by adjusting a phase angle in the power conversion apparatus including the current source converter, according to an example embodiment.
Figure 7:
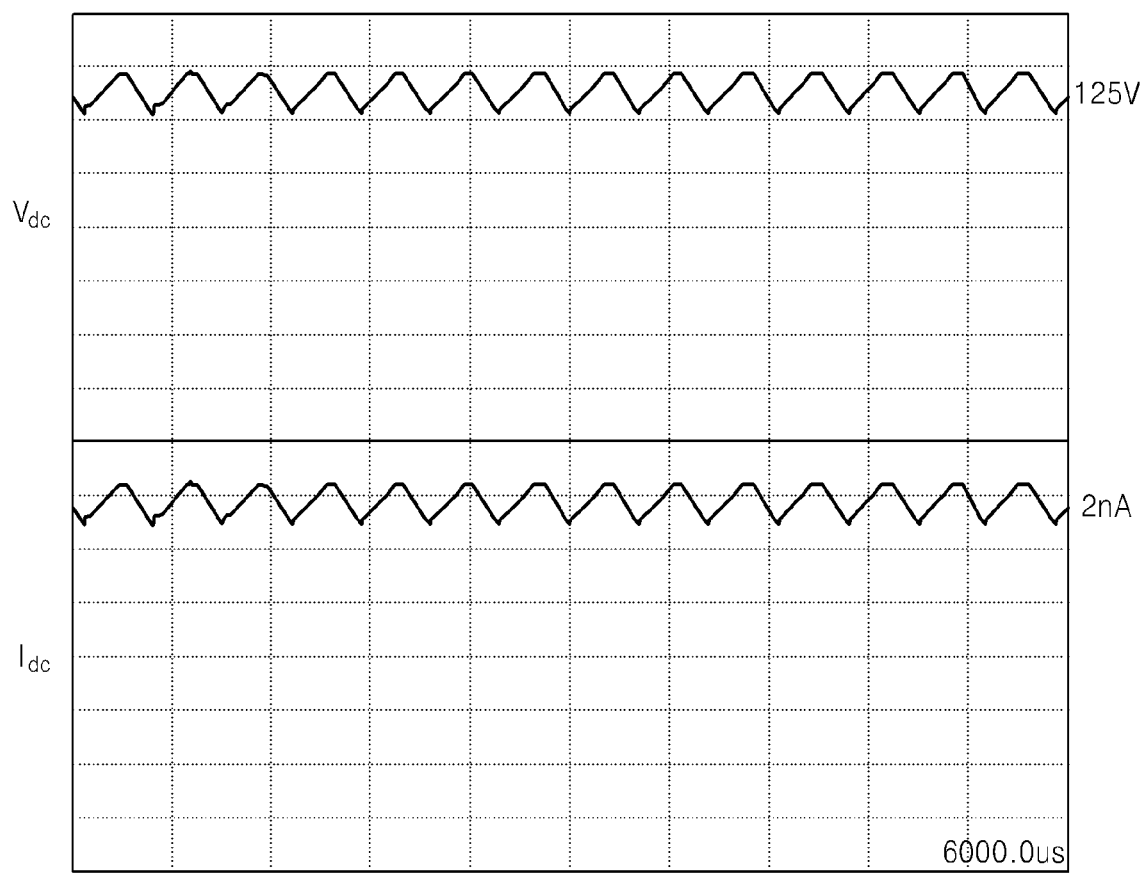
Figure 8:
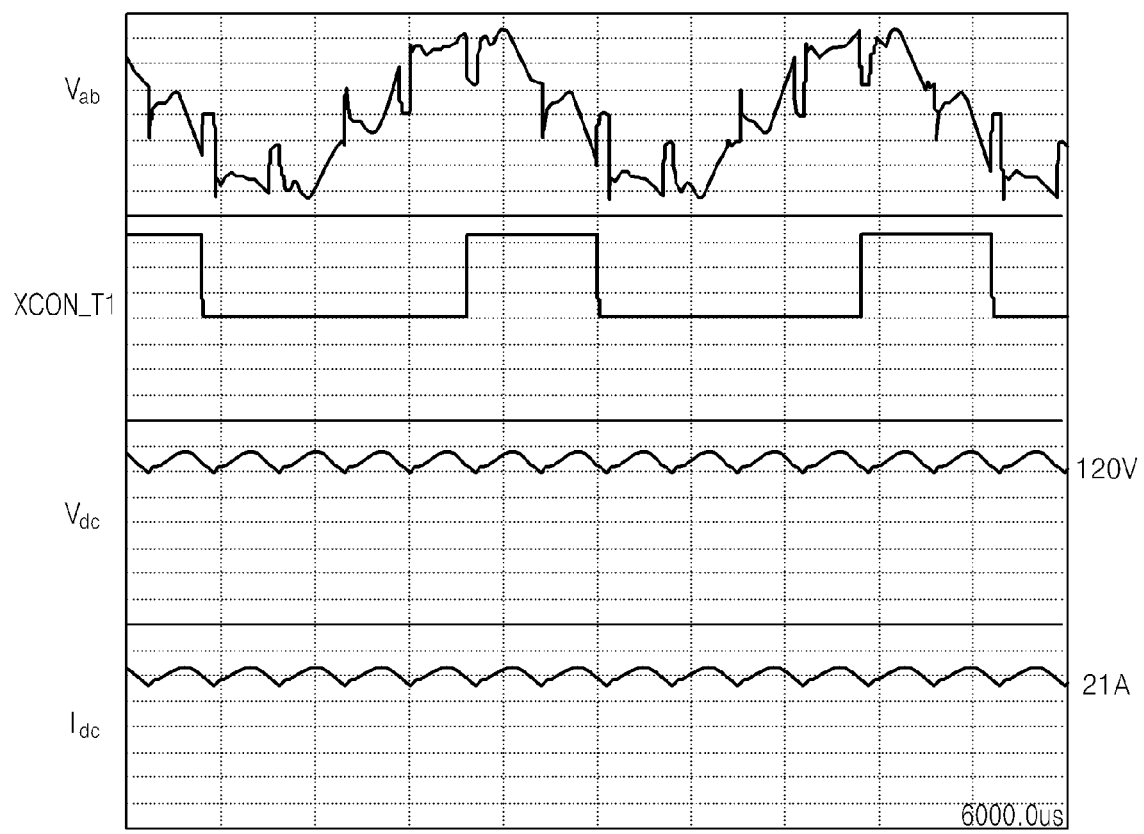

FIGS. 6 to 8 are graphs showing an operation of controlling a demanded DC link voltage and DC link current by adjusting the phase angle $\alpha$ in the power conversion apparatus PCA including the current source converter CSC, according to an example embodiment. It is assumed in FIGS. 6 to 8 that a generator included in the power conversion apparatus PCA according to an example embodiment operates at about 3,600 rpm in a normal state, and switching signals XCON_T1, XCON_T2, and XCON_T3 are set to 240 Hz.

Referring to FIGS. 1 and 6, the thyristor converter CSC is turned on in response to each of the switching signals XCON_T1, XCON_T2, and XCON_T3 respectively applied to the gates of the thyristors T1, T3, and T5 of the thyristor converter CSC and performs a rectifying operation. In a case of FIG. 6 in which the phase angle $\alpha$ is set to 0, the DC link voltage $V_{dc}$ and the DC link current $I_{dc}$ may be about 125 V and about 27 A, respectively, as shown in FIG. 7. In this case, output power of the thyristor converter CSC is about 3,375 W.

When 3 KW is demanded as output power of the power conversion apparatus PCA, according to an example embodiment, and 120 V is demanded as the DC link voltage $V_{dc}$, the power controller PCT and the phase angle controller PACT adjust the phase angle $\alpha$ in response to about 125 V, which is the DC link voltage $V_{dc}$ measured in the example of FIG. 6. A detailed operation thereof is as described above.

As a result, as shown in FIG. 8, the phase angle $\alpha$ is adjusted as an arbitrary value, and the switching signal XCON_T1 lags by the phase angle $\alpha$ and is applied to the gate G of the thyristor T1. Likewise, the thyristors T3 and T5 are also turned on after lagging by the phase angle $\alpha$. Accordingly, an amount of the DC link current $I_{dc}$ flowing through an inductor L1 of the thyristor converter CSC is adjusted, and this change of the DC link current $I_{dc}$ causes the DC link voltage $V_{dc}$ to be adjusted. FIG. 8 shows an example in which the DC link voltage $V_{dc}$ and the DC link current $I_{dc}$ are adjusted to about 120 V and about 21 A, respectively.

Figure 9:
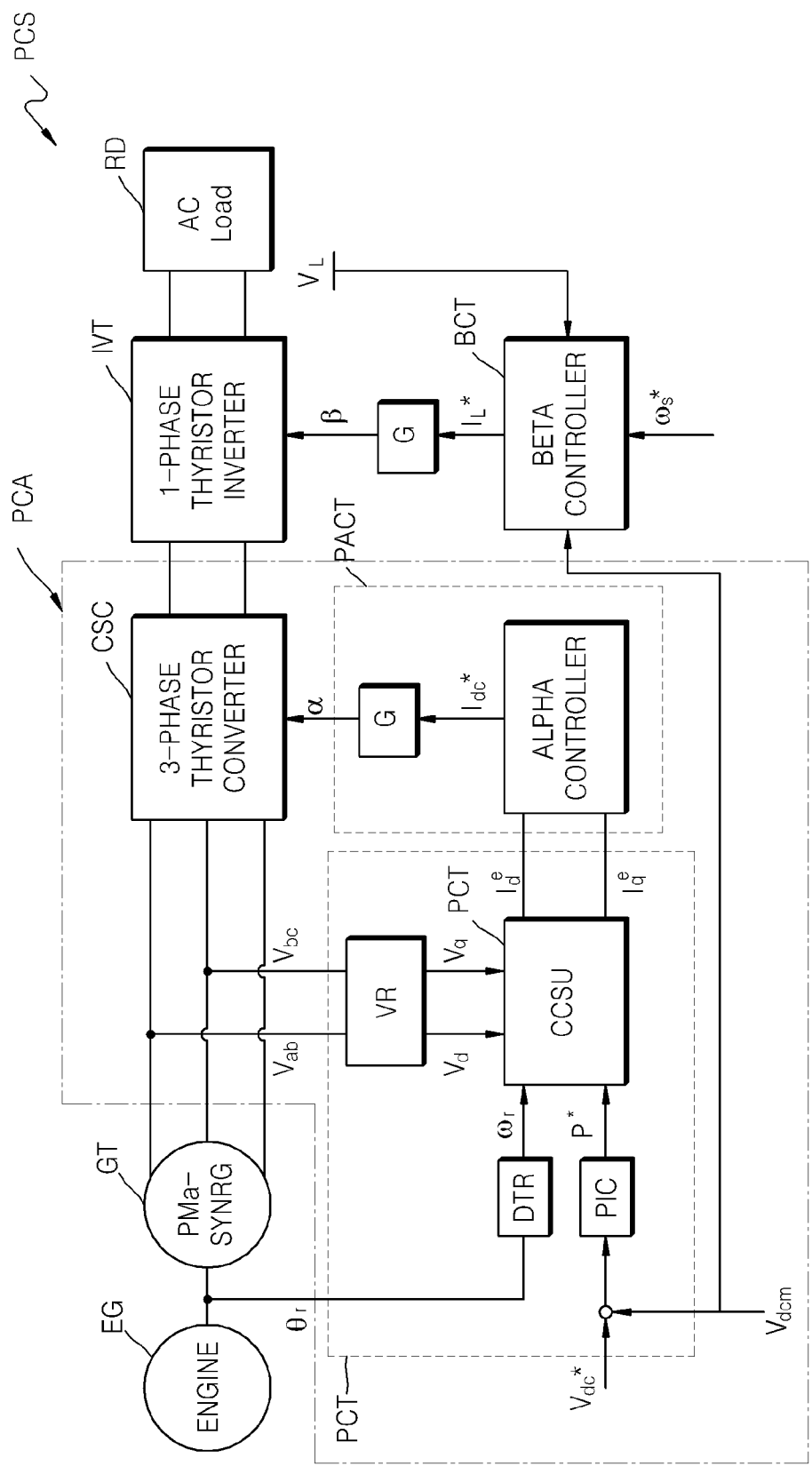
FIG. 9 is a block diagram of a power conversion apparatus according to another example embodiment.

FIG. 9 is a block diagram of a power conversion system PCS according to an example embodiment.

Referring to FIG. 9, the power conversion system PCS of FIG. 9 includes the power conversion apparatus PCA of FIG. 1 and further includes an engine EG and a generator GT for generating and applying phase voltages $V_a$, $V_b$, and $V_c$, compared to the power conversion apparatus PCA of FIG. 1. The power conversion system PCS of FIG. 9 may include, for example, a PMa-SynRG as the generator GT. However, the current example embodiment is not limited thereto. The power conversion system PCS according to another example embodiment may include an Interior Permanent Magnet (IPM) machine or an induction machine as the generator GT. The PMa-SynRG has a permanent magnet located on the q-axis, and the IPM has a permanent magnet located on the d-axis.

Figure 10:
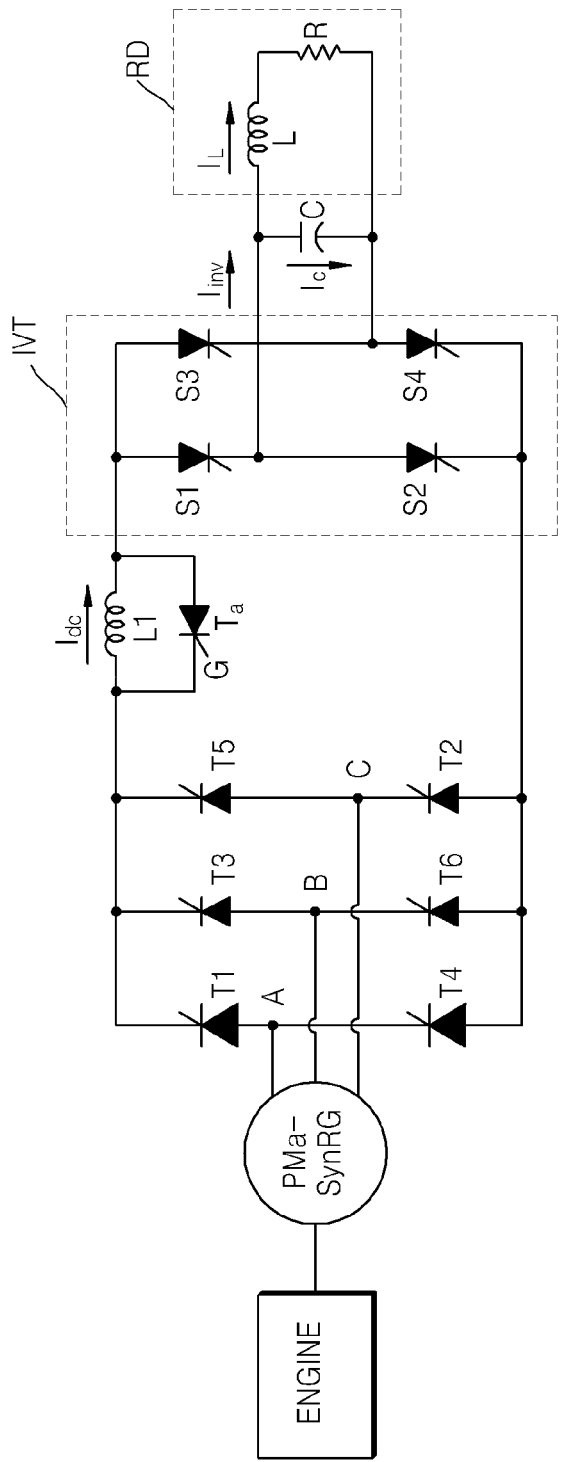
FIG. 10 is a circuit diagram of a thyristor converter, a thyristor inverter, and a load in the power conversion apparatus of FIG. 9, according to an example embodiment.

A current source converter CSC of the power conversion system PCS of FIG. 9 may be the 3-phase thyristor converter CSC shown in FIG. 5. A 1-phase thyristor inverter IVT may be connected to the output terminal of the thyristor converter CSC. The thyristor inverter IVT inverse converts the DC link voltage $V_{dc}$ and the DC link current $I_{dc}$ that are output from the thyristor converter CSC to an AC power source by using thyristors S1 to S4, as shown in FIG. 10. An output current $I_{inv}$ of the thyristor inverter IVT is supplied to a load RD.

Figure 11:
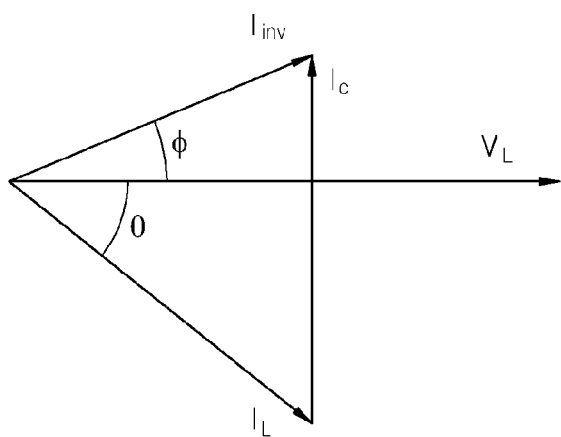
FIG. 11 is a vector diagram showing a relationship among a load voltage, a load current, and an output of the thyristor inverter, which are shown in FIG. 10.

In this case, as shown in FIG. 10, a line capacitor C may be added as a filter to an output terminal of the thyristor inverter IVT. Thus, a load current $I_L$ and a load voltage $V_L$ applied to the load RD that is represented by a resistor R and an inductor L arranged in series may be obtained by the vector diagram of FIG. 11. In FIG. 11, θ and φ denote a lagging angle and a leading angle of the output terminal of the thyristor inverter IVT, respectively.

For example, the load current $I_L$ and the load voltage $V_L$ may be represented by Equation 7. In Equation 7, $X_c$ denotes a reactance of the line capacitor C.

$$I_L = \frac{2\sqrt{2} \cdot V_L^2}{\pi R V_{dc}} \quad (7)$$

$$V_L = \frac{\pi}{\sqrt{8}} V_{dc} \frac{\sqrt{R^2 + X_c^2}}{X_c}$$

Thus, an effective current $I_P$ and an invalid current $I_Q$ may be represented by Equation 8.

$$I_P = I_L \cdot \cos\beta = \frac{V_L}{R} \quad (8)$$

$$I_Q = I_L \cdot \sin\beta = \frac{V_L}{X_C}$$

A commutation angle β may be calculated by Equations 7 and 8. A beta controller BCT of FIG. 9 may adjust an output of the thyristor inverter IVT to a value corresponding to a set frequency command $\omega_s^*$ by controlling turning-on of the thyristors S1 to S4 of the thyristor inverter IVT based on the measured load voltage $V_L$.

Figure 12:
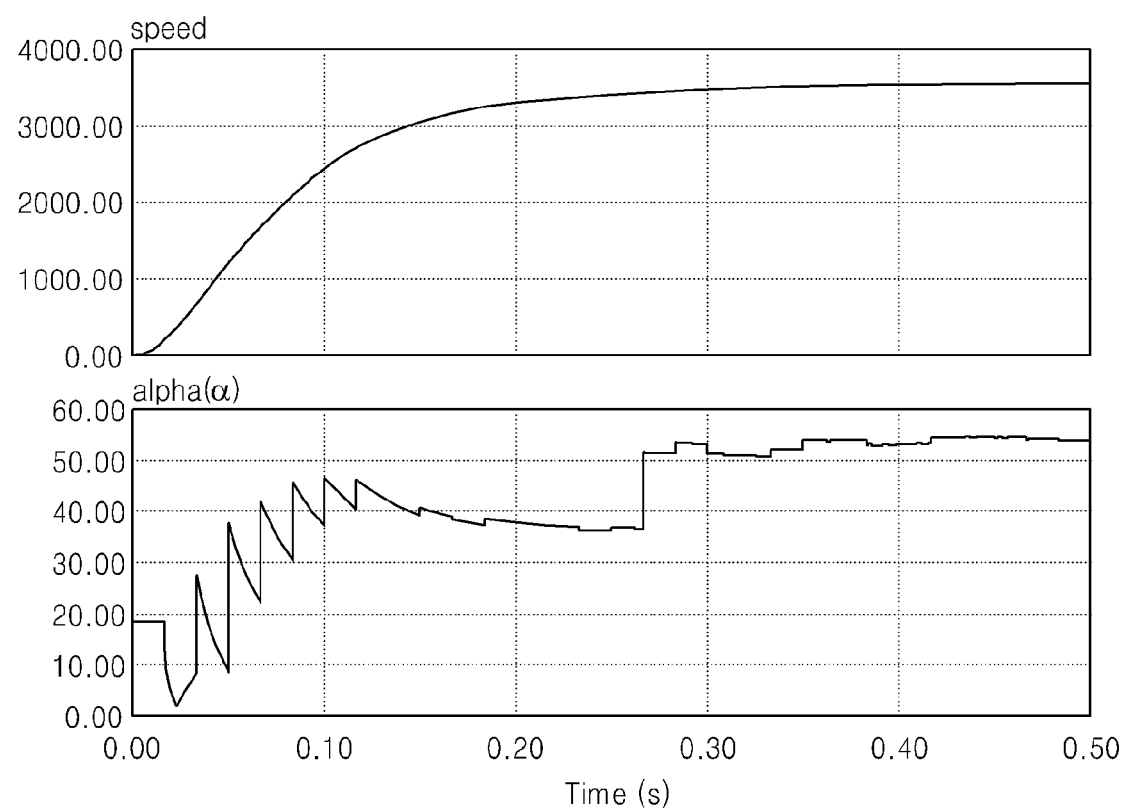
FIGS. 12 to 14 are graphs showing a result of simulating a control command when an output of the current source converter is controlled to about 3 KW in the power conversion apparatus, and a control result in response to the control command.
Figure 13:
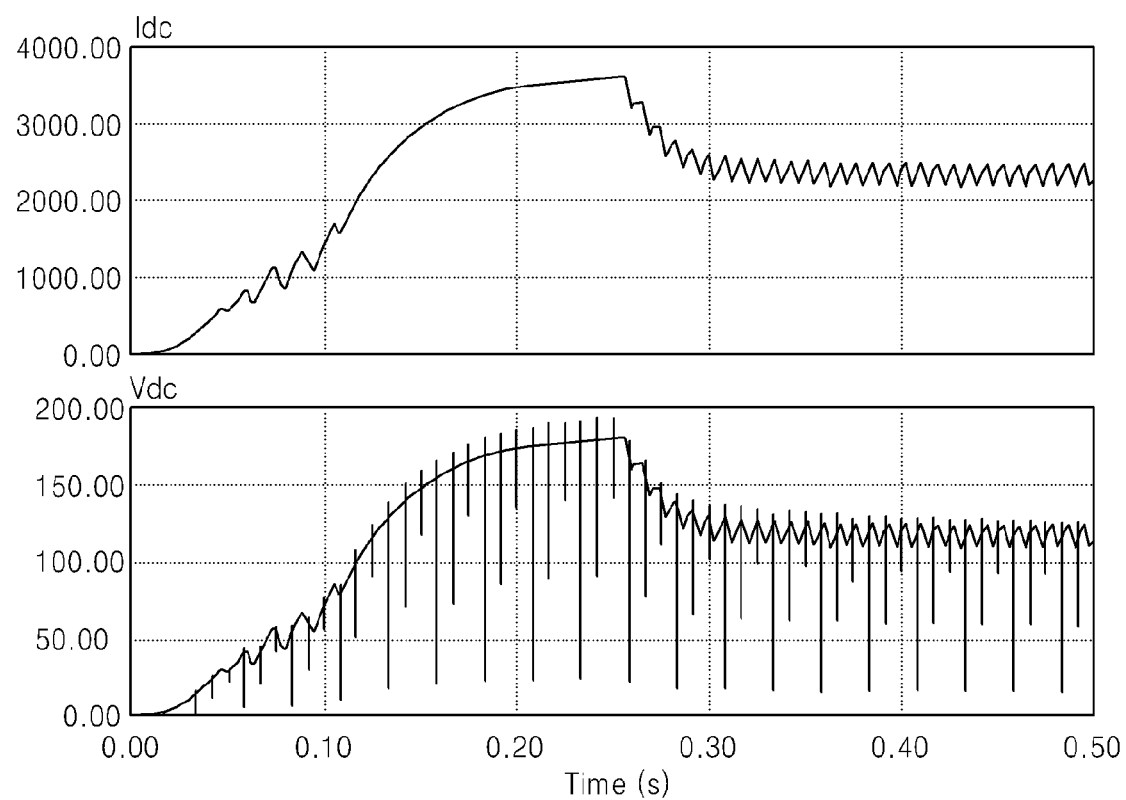
Figure 14:
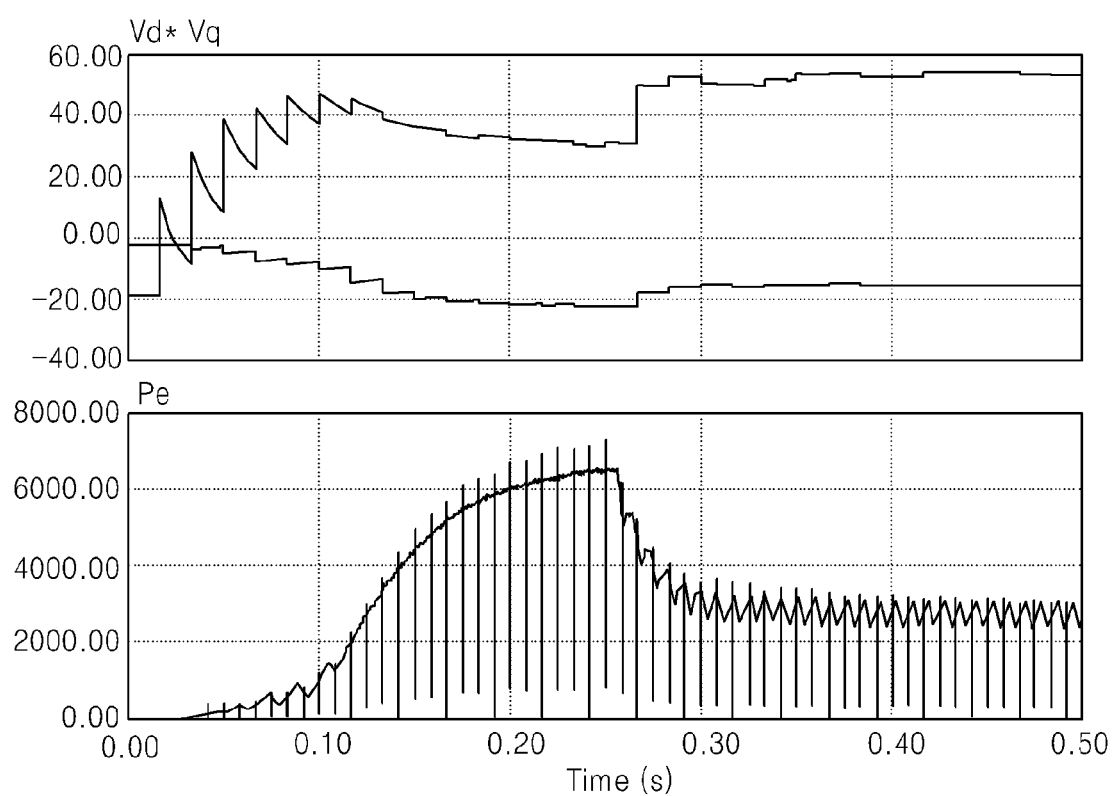

FIGS. 12 to 14 are graphs showing a result of simulating a control command when an output of the current source converter CSC is controlled to about 3 KW in the power conversion apparatus PCA, and a control result in response to the control command.

Referring to FIGS. 9 and 12 to 14, the power conversion system PCS according to another example embodiment may include a PMa-SynRG as the generator GT and a thyristor converter as the current source converter CSC. In addition, the DC link voltage $V_{dc}$ that is output from the current source converter CSC is directly used for power control.

Accordingly, as described above, the power conversion system PCS according to another example embodiment may have less switching loss with a simple control and structure and operate with a quick response time. FIGS. 12 to 14 concretely show an effect of the power conversion system PCS according to another example embodiment.

As shown in FIGS. 12 and 13, when a speed of the generator GT arrives at a normal state condition (about 3600 rpm), the DC link voltage $V_{dc}$ reaches about 120 V by a control of the phase angle α. For output power of about 3 KW, an amplitude of the phase voltage command $V_a^*$ set by the first calculating unit CU1 of the power controller PCT may be about 75 V, and the torque angle command δ* may be 123°.

In this case, the DC d-axis voltage vector $V_d$ and the DC q-axis voltage vector $V_q$ are determined from the phase voltage command $V_a^*$ and the torque angle command δ* for the output power of about 3 KW (refer to FIG. 4). As a result, as shown in FIG. 14, the power conversion system PCS according to another example embodiment supplies a 1-phase voltage and current to the load RD at about 120 V and about 60 Hz.

As described above, according to the one or more of the above example embodiments, in a power conversion apparatus and/or a method of controlling the same, a direct power control may be performed using a current source converter, thereby operating at a high efficiency even with a simple structure and control. Specifically, the power conversion apparatus and the method of controlling the same have little switching loss and a quick response time, thereby increasing or maximizing the efficiency of the power conversion apparatus.

While the present disclosure has been particularly shown and described with reference to example embodiments thereof, it will be understood by those of ordinary skill in the art that various changes in form and details may be made therein without departing from the spirit and scope of the present invention as defined by the following claims. The example embodiments described above should be considered in descriptive sense only and not for purposes of limitation. Therefore, the scope of the present invention is defined not by the detailed description of the present disclosure but by the appended claims, and all differences within the scope will be construed as being included in the present disclosure.

What is claimed is:
1. A power conversion system comprising:
   a current source converter configured to convert Alternate Current (AC) power to Direct Current (DC) power;
   a power controller configured to set a d-axis current command and a q-axis current command, which correspond to the AC power to the current source converter, by reflecting a difference between a measurement DC link voltage measured at an output terminal of the current source converter and a reference DC link voltage set by a DC link voltage command;
   a phase angle controller configured to adjust a phase angle of the current source converter and transmit the adjusted phase angle to the current source converter, in response to the d-axis current command and the q-axis current command;

a thyristor inverter connected to the output terminal of the current source converter configured to inverse convert an output of the current source converter to AC power and apply the inverse-converted AC power to a load; and a beta controller configured to control turning-on of a thyristor of the thyristor inverter by adjusting a rectifying angle, the rectifying angle calculated from an effective current and an invalid current of the load.

2. The power conversion system of claim 1, wherein the current source converter is a thyristor converter.

3. The power conversion system of claim 1, wherein the power controller comprises:

a vector rotator configured to convert a phase voltage of the AC power to a DC d-axis voltage vector and a DC q-axis voltage vector;

a proportional-integral controller configured to generate a power command by integrating the difference between the measurement DC link voltage and the reference DC link voltage;

a differentiator configured to output a rotor angular frequency of a motor, which delivers dynamic energy to a generator for generating the AC power, by differentiating a power factor angle of the generator; and a d-q axis current command setting unit configured to set the d-axis current command and the q-axis current command in response to the DC d-axis voltage vector, the DC q-axis voltage vector, the power command, and the rotor angular frequency.

4. The power conversion system of claim 3, wherein the d-q axis current command setting unit comprises:

a first calculating unit configured to receive the power command and configured to set a phase voltage command and a torque angle command;

a second calculating unit configured to set a d-axis voltage vector command and a q-axis voltage vector command in response to the phase voltage command and the torque angle command;

a current compensator configured to set a first d-axis compensation current value and a first q-axis compensation current value in response to the DC d-axis voltage vector, the DC q-axis voltage vector, and the rotor angular frequency; and an adder configured to output the d-axis current command and the q-axis current command, the d-axis current command being a sum of the first d-axis compensation current value and a second d-axis compensation current value, the q-axis current command being a sum of the first q-axis compensation current value and a second q-axis compensation current value, the second d-axis compensation current value and the second q-axis compensation current value being obtained by applying a gain to the d-axis voltage vector command and the q-axis voltage vector command, respectively.

5. The power conversion system of claim 4, wherein the first calculating unit is configured to set the torque angle command by differentiating output effective power of the generator by a torque angle.

6. The power conversion system of claim 5, wherein the torque angle command indicates a value of a torque angle for generating maximum output effective power from the AC power.

7. The power conversion system of claim 1, wherein the phase angle controller is configured to set a DC link current command indicating a value of a DC link current of the current source converter demanded by the d-axis current command and the q-axis current command and adjust the phase angle for controlling a rectifying device of the current source converter by applying a gain to the DC link current command.

8. A power conversion system comprising:
the power conversion system of claim 1; and
a generator configured to generate the AC power.

9. The power conversion system of claim 8, wherein the generator includes at least one selected from the group consisting of a Permanent Magnet- assisted Synchronous Reluctance Generator (PMa-SynRG), an interior permanent magnet generator, and an induction machine.

10. A method of controlling a power conversion system, the method comprising:

measuring a Direct Current (DC) link voltage at an output terminal of a current source converter configured to convert Alternate Current (AC) power to DC power;

setting a d-axis current command and a q-axis current command, which correspond to the AC power applied to the current source converter, by reflecting a difference between the measured DC link voltage and a reference DC link voltage demanded by the current source converter;

controlling a DC link voltage of the current source converter by adjusting a phase angle of the current source converter in response to the d-axis current command and the q-axis current command;

inversely converting an output of the current source converter to AC power;

applying the inverse-converted AC power to a load; and controlling turning-on of a thyristor of the thyristor inverter by adjusting a rectifying angle, the rectifying angle calculated from an effective current and an invalid current of the load.

11. The method of claim 10, wherein the current source converter is a thyristor converter.

12. The method of claim 10, wherein the setting of the d-axis current command and the q-axis current command comprises:

converting a phase voltage of the AC power to a DC d-axis voltage vector and a DC q-axis voltage vector;

generating a power command by integrating the difference between the measurement DC link voltage and the reference DC link voltage;

outputting a rotor angular frequency of a motor, the motor delivering dynamic energy to a generator for generating the AC power, by differentiating a power factor angle of the generator; and setting the d-axis current command and the q-axis current command in response to the DC d-axis voltage vector, the DC q-axis voltage vector, the power command, and the rotor angular frequency.

13. The method of claim 12, wherein the setting of the d-axis current command and the q-axis current command comprises:

receiving the power command and setting a phase voltage command and a torque angle command;

setting a d-axis voltage vector command and a q-axis voltage vector command in response to the phase voltage command and the torque angle command;

setting a first d-axis compensation current value and a first q-axis compensation current value in response to the DC d-axis voltage vector, the DC q-axis voltage vector, and the rotor angular frequency; and outputting the d-axis current command and the q-axis current command, the d-axis command being a sum of the first d-axis compensation current value and a second d-axis compensation current value, the q-axis current command being a sum of the first q-axis compensation current value and a second q-axis compensation current value, the second d-axis compensating current value and the second q-axis compensation current value being obtained by applying a gain to the d-axis voltage vector command and the q-axis voltage vector command, respectively.

14. The method of claim 13, wherein the setting of the torque angle command includes setting the torque angle command by differentiating, by a torque angle, output effective power of the generator for generating the AC power.

15. The method of claim 14, wherein the torque angle command indicates a value of a torque angle for generating maximum output effective power from the AC power.

16. The method of claim 14, wherein the generator includes at least one selected from the group consisting of a Permanent Magnet-assisted Synchronous Reluctance Generator (PMa-SynRG), an interior permanent magnet generator, and an induction machine.

17. The method of claim 10, wherein the controlling of the DC link voltage of the current source converter includes setting a DC link current command, the DC link current command indicating a value of a DC link current of the current source converter demanded by the d-axis current command and the q-axis current command, and adjusting the phase angle for controlling a rectifying device of the current source converter by applying a gain to the DC link current command.

* * * * *